Figure 1:
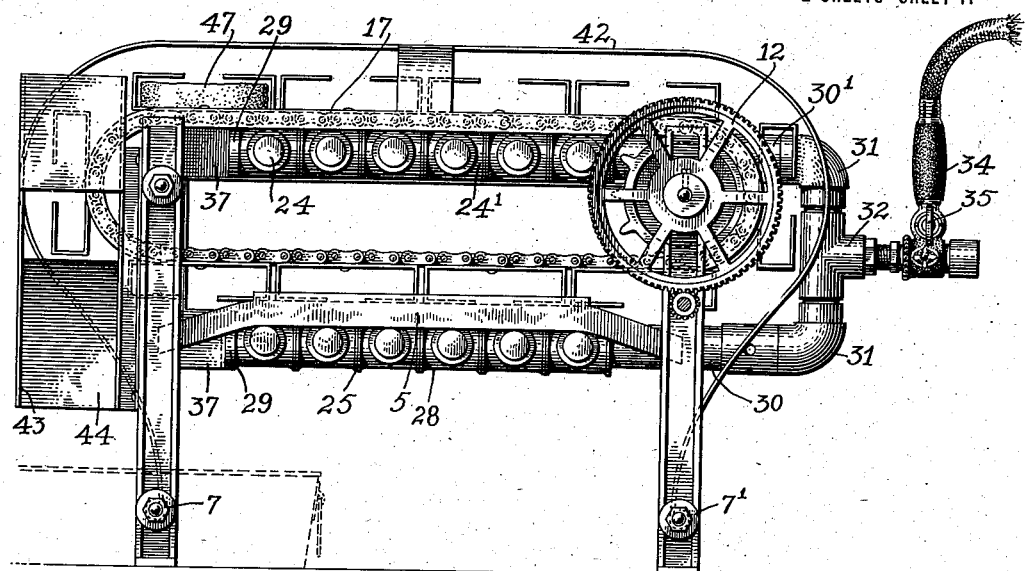

A. A. HILL.
BREAD TOASTER.
APPLICATION FILED JULY 17, 1915.

1,171,122.

Patented Feb. 8, 1916.
2 SHEETS—SHEET 1.

Arthur A. Hill Inventor
By his Attorneys
Rosenbaum, Stockbridge & Borst

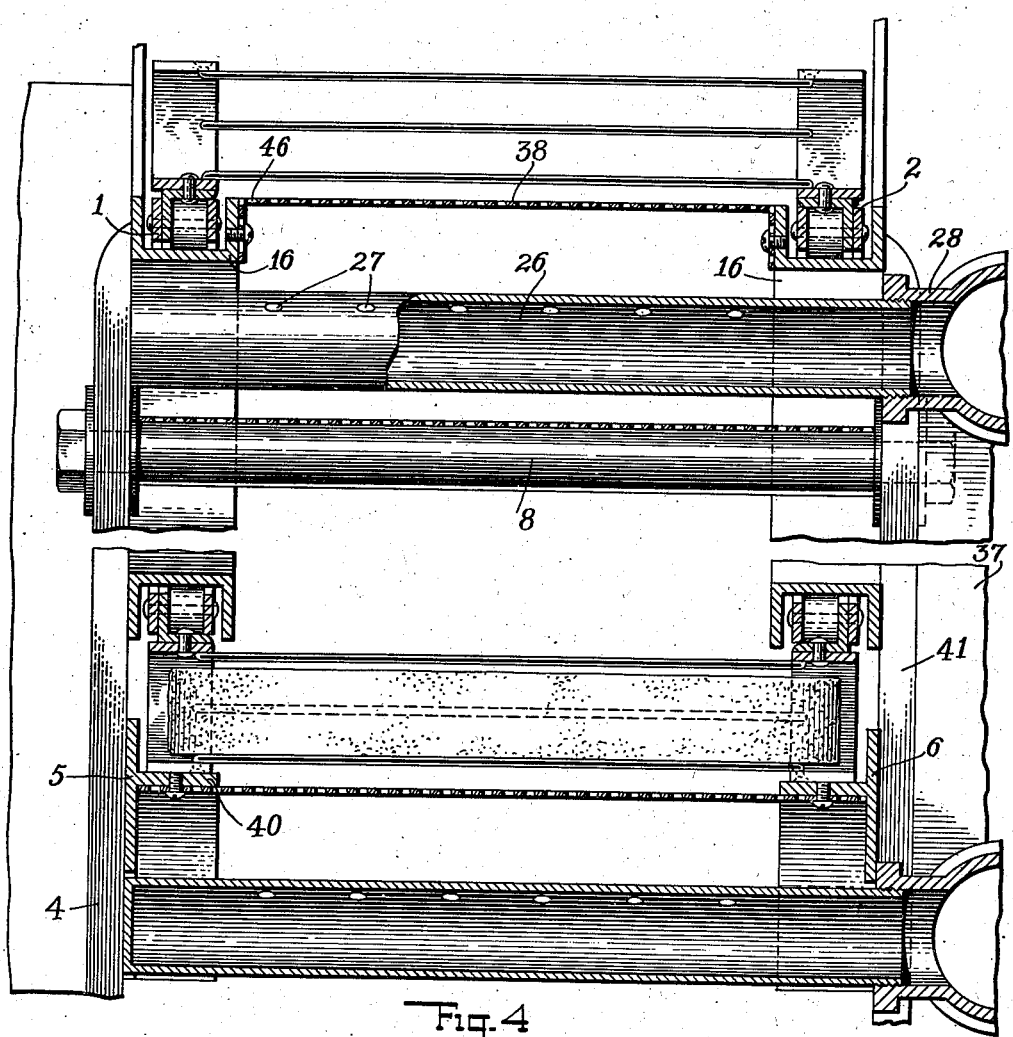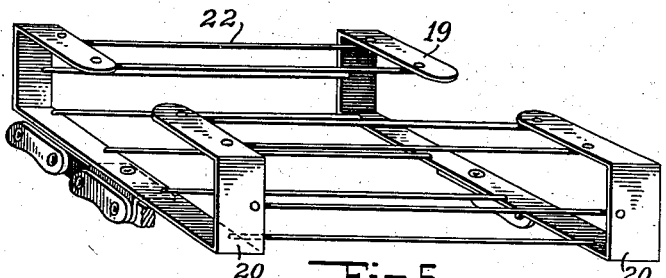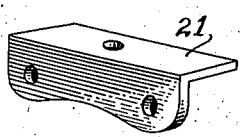

UNITED STATES PATENT OFFICE.

ARTHUR A. HILL, OF NEW YORK, N. Y.

BREAD-TOASTER.

1,171,122.  Specification of Letters Patent.  Patented Feb. 8, 1916.

Application filed July 17, 1915. Serial No. 40,530.

*To all whom it may concern:*

Be it known that I, ARTHUR A. HILL, a citizen of the United States, residing at the city of New York, in the borough of Manhattan and State of New York, have invented certain new and useful Improvements in Bread-Toasters, of which the following is a full, clear, and exact description.

This invention relates to bread toasters adapted for use in restaurants, grills, hotels and like places where the daily consumption of toast is high, and has for its object the provision of a device upon which slices of bread may be toasted to an even brown upon both sides and produced in large quantities in a relatively short period of time.

It is also the object of the invention to provide a toaster in which the feeding and discharging of the bread and toast from the device is performed with the greatest ease and facility, the placing of a fresh slice of bread in the toaster ejecting the one which has been toasted.

My invention contemplates utilizing the general principle of an endless carrier or conveyer having a plurality of holders or magazines mounted thereon, which are heated by gas burners. I am aware that bake ovens for pies and like articles have been constructed upon this general principle, but heretofore it has been the practice to arrange a gas burner above and another below one run of the carrier, so that the flames strike the articles on the holders from opposite sides simultaneously. This may suffice for baking purposes, but for a toaster where it is essential that the bread be evenly browned upon both sides, the air current resulting from the heat will divert the flames which are directed downwardly sufficient to cause the side of the slice upon which they act to be toasted to a less degree than is the side which is toasted from the upwardly directed flames. My invention therefore contemplates arranging below the upper and lower runs of the carrier, respectively, a row of gas burners, the flames from each row being directed upwardly and constructed so as to produce substantially the same degree of heat. The currents of air which are set in circulation around the toaster do not then materially affect the direction of the flames, and the toast in this manner may be evenly browned on both sides without turning the holder relatively to the carrier.

In order to prevent the flames from the gas burners striking directly upon the slices of the bread, perforated plates are arranged between them and the holders or magazines for the slices of bread. The plate interposed between the lower series of gas burners and the holders will also serve as a deflector to prevent currents of air being set up, which would affect the flames from the upper series of gas burners to cause the toast to be browned more on one side than on the other. If desired, an extra deflector may also be provided between the two rows of gas burners for the same purpose.

My invention also contemplates a peculiar form of holder or magazine for the toast. These holders or magazines comprise skeleton cages, and my invention consists in providing such a cage with the end faces thereof, which are parallel to the endless carrier, open so that after the slice of bread has been toasted, a fresh piece of bread may be inserted in the holder from one end, which will cause the ejection of the toasted piece through the other open end of the holder. In this manner, the output of the toaster is materially increased, since it is not necessary to stop the machine to remove the toasted slices and replace them with fresh ones.

In the accompanying drawing, I have shown one practical embodiment of the invention.

Figures 2, 3:
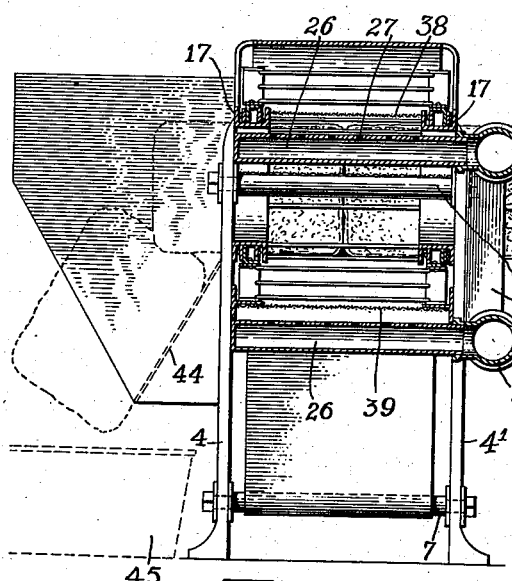

Figure 1 shows a side elevation of a bread toaster constructed in accordance with the principles of my invention; Fig. 2 is a vertical section taken on the line 2—2, looking in the direction of the arrow; Fig. 3 is a similar section taken on the line 3—3, looking in the direction of the arrow; Fig. 4 is an enlarged detail of the endless carrier and associated parts; Fig. 5 shows in perspective one of the magazines or holders; and Fig. 6 is a similar view of the link or piece which connects the magazine or holder to the endless carrier.

The skeleton endless carrier which comprises two chains 1 and 2, may be supported and moved in any suitable manner. In the specific embodiment shown, the supporting frame comprises two pairs of legs or uprights 3, 3' and 4, 4', the pairs of uprights being maintained in spaced relation to each other by cross pieces 5 and 6, respectively, which cross pieces are secured to the legs by welding or in any other desired manner.

The legs of each pair are also maintained in spaced relation by stays or bolts 7, 7', passing through them at a point adjacent their lower ends. The upper ends of the uprights 4, 4' are connected by a similar stay or bolt 8, while the uprights 3 and 3' are connected by a shaft or spindle 9. Mounted upon the spindle 9, one adjacent the inner face of each of the uprights, are two sprocket wheels 10 which are fastened to the shaft to rotate therewith, as by the set screws 11. One end of the shaft 9 extends exteriorly of the upright 3' and has secured to it a gear 12, which, together with the sprocket wheels 10, 10, hold the uprights 3, 3' in spaced relation to each other at their upper ends. Mounted on a suitable stub shaft 13 supported by the leg 3' is a pinion 14 which meshes with the gear wheel 12. The stub shaft 13 may be driven manually, as by a crank or if desired, by means of a spring or electric motor. Secured to the inner faces of the uprights 4, 4', are semi-circular or curved tracks 16 which, with the sprocket wheels 10, support the endless chains 1 and 2. These tracks are U-shaped in cross section, as shown in Figs. 2 and 4, and will therefore prevent the chains from lateral displacement. Between the sprocket wheels and the curved tracks 16, the upper half of the two chains 1 and 2 rest in U-shaped tracks 17 which prevent any sagging of the chains.

Mounted upon the chains 1 and 2 are a plurality of holders or magazines 19, each of which is adapted to receive a slice of the bread which is to be toasted. In the form shown, each of these holders comprises wire cages consisting of side pieces 20, 20 of relatively narrow strips of sheet metal bent into substantially rectangular shape. These side pieces are secured to the chains 1 and 2 by the L-shaped links 21, one leg of a link being inserted between the links of the chain and the other leg being riveted to the strips 20, or otherwise secured thereto. The ends of the side pieces 20 need not be joined, as shown, but this is unimportant. Connecting the side pieces 20 are a plurality of slender rods or wires 22 which are secured to the side pieces in any suitable manner. The cage thus formed incloses the slice of bread on four sides, but leaves the ends which are parallel to the endless carrier, i. e., the chains 1 and 2, open, so that the toast or bread may be ejected from or inserted laterally into the holder. This last named feature is important and will be referred to in the description of the operation of the device.

The bread is toasted by means of two rows of gas burners 24 and 25, which are arranged below the upper and lower runs of the skeleton carrier, respectively. Each burner of a row, in the construction shown, comprises a straight tubular member 26 provided with a plurality of jet openings 27 in its upper face, so that the flames which issue from the burner will be directed upwardly, as will be later referred to. The tubular members 26 are closed at one end and are connected at the other end to T's 28, the T's of each row being joined together to provide two pipes, one end of each of which is closed as by a cap 29, and the other end of which is connected to pipes 30 and 30', which are connected by elbows 31 and short connecting pieces to a T 32 which communicates with a supply of gas 34 adapted to be controlled by a valve 35. The pipes 30 and 31 are each secured to the upright 3 of the frame by means of straps 36. Secured to the upright 4' is a U-shaped strip or bar 37, the extremity of the legs of which are bent at right angles to the main portion of the same, and are secured to the caps 29. The gas burners are thus rigidly positioned below the upper and lower runs of the carrier and their connections with the uprights 3 and 4' will also serve to maintain the uprights of the frame in spaced relation to each other. Arranged beneath the holders on each run of the endless carrier are screens or perforated plates 38 and 39, respectively, which screens or plates prevent the gas flames from playing directly upon the slices of bread to be toasted, to thereby burn them. The upper plate 38 has its outer edges bent over as at 40, and is secured to the inner faces of the U-shaped tracks 17, while the lower screen or plate 39 is secured to the lower face of an inwardly projecting flange 40 carried by each of the cross pieces 5 and 6. The flanges 40 on the cross pieces serve as a track for the holders and will prevent the lower run of the carrier from sagging or from being laterally displaced, similar to the tracks 17 for the upper run.

The carrier is protected by a hood or top 42 comprising a strip of sheet metal of a width substantially that of the holders and extending over the top of the toaster and around the ends thereof, the hood being secured at its lower ends to the stays or bolts 7. Secured to this top and to the upright 4 is a chute 43 having an incline 44 upon which the toast, as it is ejected from the holder, drops, from which it may be transferred to a suitable receptacle, as a basket or pan 45. A third perforated plate or screen 46 may be used, which rests upon the stay or bolt 8 and the spindle or shaft 9, which screen serves as a deflector to cause the heated air passing upwardly to be diverted into the air surrounding the toaster instead of passing directly upwardly therethrough.

The operation of the toaster is obvious from the description, but will be briefly set forth. Assuming that the gas has been turned on and the burners lighted, the perforated plates or screens 38 and 39 will soon become highly heated similar to the screens used in an ordinary bread toaster. The screens 39 and 46 also serve as deflectors to prevent currents of air passing directly upwardly through the toaster and thus affecting the flames from the upper rows of burners. This is important since it is essential to construct the gas burners so that the screens 38 and 39 will be heated to approximately the same temperature, and to do this, air currents should be avoided in so far as possible. After the burners have been lighted, or if desired even before this has been done, the slices of bread, one of which has been designated 47, are inserted laterally into each of the holders as they in their travel reach the end of the device adjacent the chute 43. Assuming that the rotation of the shaft 13 is such that the carrier moves in the direction of the arrow in Fig. 1, and that the piece 47 has just been inserted in the holder. As the carrier moves, the underside of this piece will be toasted by its slow movement over the highly heated screen 38 which is maintained at the desired temperature by the gas burners and as the carrier continues rotating, the piece of bread will finally reach the lower run of the carrier in a reversed position to that which it occupied upon the upper run. The upper face of the slice will then be toasted in the same manner by passing over the heated screen 39 and as the gas burners are arranged so that the intensity of the heat of the screens is substantially the same, the piece will be toasted to an even brown upon both sides. As the piece reaches the end of the carrier at which it was inserted, the operator stands ready with a fresh slice of bread to replace the toasted ones. This is done by pushing or inserting the fresh piece laterally into the holder which will cause the toasted piece to be ejected, dropping into the chute and receptacle as shown in dotted lines in Fig. 2. It is therefore unnecessary to stop the toaster to replace the toasted slices with fresh slices of bread and the operation of the device will therefore be continuous until the desired quantity of toast is obtained. The speed of movement of the endless carrier depends upon the intensity of the heat produced by the gas burners and the length of the upper and lower runs of the carrier, and may be readily determined after several pieces have been toasted.

It will therefore be seen that I have provided a toaster by which large quantities of toast of an even grade, may be produced in a short period of time.

I claim:

1. In a bread toaster, an endless skeleton carrier, a plurality of gas burners arranged below the upper and lower runs of the carrier, respectively, said burners having their jets arranged to direct flames issuing therefrom upwardly, a plurality of skeleton holders each adapted to receive a slice of bread to be toasted mounted on said carrier, and screens interposed between the gas burners and the upper and lower runs of the carrier, respectively.

2. In a bread toaster, an endless skeleton carrier, a plurality of gas burners arranged below the upper and lower runs of the carrier, respectively, said burners having their jets arranged to direct flames issuing therefrom upwardly, a plurality of skeleton holders each adapted to receive a slice of bread to be toasted mounted on said carrier, screens interposed between the gas burners and the upper and lower runs of the carrier, respectively, and a deflector arranged between the two sets of gas burners.

3. In a bread toaster, an endless skeleton carrier, a row of gas burners arranged below the upper and lower runs of the carrier, respectively, said burners having their jets arranged to direct the flames issuing therefrom upwardly, a plurality of skeleton holders mounted on said carrier, each of said holders comprising a substantially rectangular skeleton cage having the opposite end faces thereof parallel to the endless carrier open whereby the emplacing of a slice of bread to be toasted in the holder will eject the piece which has been toasted, and screens interposed between the rows of gas burners and the upper and lower runs of the carrier, respectively.

4. In a bread toaster, an endless skeleton carrier, a row of gas burners arranged below the upper and lower runs of the carrier, respectively, said burners having their jets arranged to direct flames issuing therefrom upwardly, a plurality of skeleton holders mounted on said carrier, each of said holders comprising a substantially rectangular skeleton cage having the opposite end faces thereof parallel to the endless carrier open whereby the emplacing of a slice of bread to be toasted in the holder will eject the piece which has been toasted, a chute arranged at one end of said endless carrier arranged to receive the toasted pieces when ejected from the holders, and screens interposed between the rows of gas burners and the upper and lower runs of the carrier, respectively.

5. In a bread toaster, an endless skeleton carrier comprising two endless belts, a plurality of skeleton holders mounted upon said belts in spaced relation to each other, pulleys, one at one end of each of said belts, a semi-circular guide for the other end of each of said belts, a row of gas burners arranged below the upper and lower ends of said carrier, respectively, said burners having their jets arranged to cause the flames issuing therefrom to be directed upwardly, and screens arranged between the rows of burners and the upper and lower runs of said carrier, respectively.

6. In a bread toaster, a skeleton endless carrier comprising two spaced endless chains, a plurality of holders mounted on said chains and maintaining them in spaced relation to each other, each of said holders comprising a wire cage secured at its ends to said chains, sprocket wheels, one at one end of each of said chains, semi-circular guides for the other ends of each of said chains, a row of gas burners arranged below the upper and lower runs of said carrier, respectively, said burners having their jets arranged to direct flames issuing therefrom upwardly, and screens arranged between the rows of gas burners and the upper and lower runs of said carrier, respectively.

7. In a bread toaster, a skeleton endless carrier comprising two spaced endless chains, a plurality of holders mounted on said chains and maintaining them in spaced relation to each other, each of said holders comprising a wire cage secured at its ends to said chains, sprocket wheels one at one end of each of said chains, semi-circular guides for the other ends of each of said chains, tracks in which the upper half of each of said chains rides, said guides forming a continuation of said tracks, guides for the holders on the lower half of said carrier for preventing the sagging of the chain and lateral displacement of the holders, a row of gas burners arranged below the upper and lower runs of said carrier, respectively, said burners having their jets arranged to direct flames issuing therefrom upwardly, and screens arranged between the rows of gas burners and the upper and lower runs of said carrier, respectively.

In witness whereof, I subscribe my signature, in the presence of two witnesses.

ARTHUR A. HILL.

Witnesses:
 WALDO M. CHAPIN,
 MARY G. HART.